United States Patent
Wu et al.

(10) Patent No.: US 12,335,908 B1
(45) Date of Patent: Jun. 17, 2025

(54) METHOD FOR POSITIONING, ACCESS POINT AND COMPUTER PROGRAM PRODUCT

(71) Applicant: TP-Link Systems Inc., Irvine, CA (US)

(72) Inventors: Lvhua Wu, Shenzhen (CN); Jiaxin Chen, Shenzhen (CN); Tong Ding, Shanghai (CN)

(73) Assignee: TP-Link Systems, Inc., Irvine, CA (US)

( * ) Notice: Subject to any disclaimer, the term of this patent is extended or adjusted under 35 U.S.C. 154(b) by 0 days.

(21) Appl. No.: 18/926,206

(22) Filed: Oct. 24, 2024

(51) Int. Cl.
*H04W 64/00* (2009.01)

(52) U.S. Cl.
CPC ................... *H04W 64/003* (2013.01)

(58) Field of Classification Search
CPC ........................... H04W 64/003; H04W 64/00
See application file for complete search history.

(56) References Cited

U.S. PATENT DOCUMENTS

| | | | | |
|---|---|---|---|---|
| 2015/0089595 | A1* | 3/2015 | Telles | G07F 17/3225 726/4 |
| 2015/0346313 | A1* | 12/2015 | Smith | G01S 5/02524 342/465 |
| 2019/0265367 | A1* | 8/2019 | Silverman | G01S 5/04 |
| 2021/0068070 | A1 | 3/2021 | Segev | |
| 2023/0379911 | A1 | 11/2023 | Wu | |

FOREIGN PATENT DOCUMENTS

CN 117156391 A 12/2023

\* cited by examiner

*Primary Examiner* — Justin Y Lee
(74) *Attorney, Agent, or Firm* — Loeb & Loeb LLP

(57) ABSTRACT

The present disclosure provides a method for positioning, an access point (AP) and a computer program product. The method may include: obtaining a location information of a client device wirelessly coupled to the AP; determining a location information of the AP based on the location information of the client device; and in response to determining that the location information of the AP is invalid, transmitting a notification indicating the invalidity of the location information of the AP to one or more client devices bound to the AP.

20 Claims, 6 Drawing Sheets

METHOD FOR POSITIONING, ACCESS POINT AND COMPUTER PROGRAM PRODUCT

TECHNICAL FIELD

The present disclosure relates to wireless communication, and more specifically, to a method for positioning, an access point (AP) and a computer program product.

BACKGROUND

Currently, wireless APs are widely deployed in wireless networks to provide wireless network services to one or more wireless client devices. APs enable the client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies.

With the use of consumer devices capable of providing wireless communication continuously expanding over the last few decades, radio frequency resources allocated to wireless communication have become increasingly congested. A wireless communication frequency band, e.g., a 6 Gigahertz (GHz) band, may be utilized for communication by incumbent radios. Other devices, e.g., Wi-Fi radios, may be required to honor the incumbent radios, when using the wireless communication frequency band. For example, a transmission power of non-incumbent radios, e.g., Wi-Fi radios, may be restricted, for example, to ensure that any interference from the non-incumbent radios to the incumbent radios will be low enough, e.g., 6 decibels (dBs) below received incumbent signal power. The allocation of radio frequency resources and transmission powers for APs should consider the location of the APs. The conventional routers always have no positioning module, and thus if the installed positions of the routers are unknow, the geolocations of the routers are not available.

SUMMARY

In view of the above problems, the present disclosure provides a method for positioning, an access point (AP) and a computer program product.

According to one embodiment of the present disclosure, there is provided a method for positioning performed by an AP, comprising: obtaining a location information of a client device wirelessly coupled to the AP; determining a location information of the AP based on the location information of the client device; and in response to determining that the location information of the AP is invalid, transmitting a notification indicating the invalidity of the location information of the AP to one or more client devices bound to the AP.

According to another embodiment of the present disclosure, there is provided an AP, comprising: one or more processors; a memory coupled to at least one of the processors; and a set of computer program instructions stored in the memory, which, when executed by at least one of the processors, perform actions of: obtaining a location information of a client device wirelessly coupled to the AP; determining a location information of the AP based on the location information of the client device; and in response to determining that the location information of the AP is invalid, transmitting a notification indicating the invalidity of the location information of the AP to one or more client devices bound to the AP.

According to yet another embodiment of the present disclosure, there is provided a computer program product for positioning of an AP, the computer program product comprising a non-transitory computer readable storage medium having program instructions embodied therewith, the program instructions executable by a processor of the AP to cause the processor to: obtain a location information of a client device wirelessly coupled to the AP; determine a location information of the AP based on the location information of the client device; and in response to determining that the location information of the AP is invalid, transmit a notification indicating the invalidity of the location information of the AP to one or more client devices bound to the AP.

At least based on the above embodiments of the present disclosure, through determining the location information of the AP based on the location information of the client device wirelessly coupled to the AP, the conventional APs without a positioning module can obtain its location information, which may be used to for AFC authentication. Moreover, when the AP's location information becomes invalid, the expiration notification can be promptly notified to the client device of the user, allowing for timely repositioning and reporting of the updated location as well as re-enabling the AFC functionality, avoiding unnecessary delays due to the user's inability to timely learn of the invalid location information.

BRIEF DESCRIPTION OF THE DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
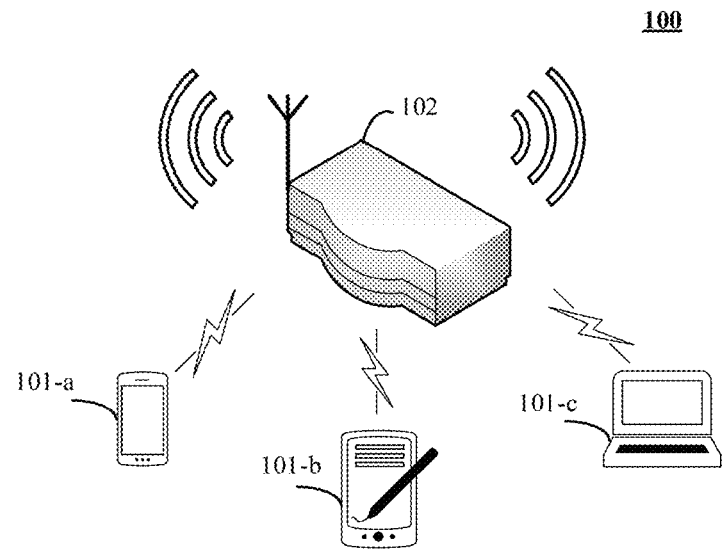
FIG. 1 illustrates an exemplary schematic diagram of a wireless communication system according to an embodiment of present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis. Technical features involved in different embodiments of the present disclosure described below may be combined with each other as long as no conflicts occurs therebetween.

In the present disclosure, an AP, which may be interchangeably referred to as a wireless access point (WAP), is a communication device that can communicate with a non-AP (e.g., a station (STA) or client device) in a WLAN and that allows the non-AP to connect to a wired network. The AP usually connects to a router (via a wired network) as a standalone device, but it can also be integrated with or employed in the router. Likewise, in the present disclosure, a non-AP (e.g., a client device or station, which is interchangeably referred to as a STA) is a communication device that can communicate with an AP to obtain various communication services such as voice, video, packet data, messaging, broadcast, etc. The STA can be any device that contains an IEEE 820.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "client device", "wireless client", "user" and "user device" are often used interchangeably.

In the present disclosure, a STA in a WLAN may work as an AP at a different occasion, and vice versa. This is because communication devices in the context of IEEE 820.11 (Wi-Fi) technologies may include both STA and AP hardware components. In this manner, the communication devices may switch between a STA mode and an AP mode, based on actual WLAN conditions and/or requirements. In various embodiments below, a non-AP STA may refer to a STA in a WLAN that is not implemented as an AP.

FIG. 1 illustrates an exemplary schematic diagram of a wireless communication system according to an embodiment of present disclosure.

As shown in FIG. 1, the wireless communication system 100 may be employed in 802.11 WLAN networks and may include an access point (AP) 102, communication devices or client devices 101-a, 101-b and 101-c (collectively referred to as a communication device or client device 101). In some embodiments, the communication devices 101-a, 101-b and 101-c may be communication devices configured to communicate with the AP 102 using a wireless proximity communication protocol, such as but not limited to, near field communication (NFC), Bluetooth®, Bluetooth® Low Energy (BLE), infrared, a wireless local area network (WLAN) such as Wi-Fi® or Ethernet, a home area network, a building area network, a campus area network, or the like. Examples of the communication devices 101 may include, for example, smartphones, tablets, computers, and other internet-capable devices. In the embodiments illustrated in FIG. 1, mobile phones, tablets and laptops are used as examples. The AP 102 may be communicatively connected with the communication devices 101, and transmit the information originated from the AP 102 to the communication devices 101, receive the information from the communication devices 101, or relay the information originated from one or more other communication entities to the communication devices 101. In this way, the communication devices 101 may transmit and receive data packets to and from the network through the AP 102, which permits the devices to access a variety of communication services from the Internet, including voice, video, packet data, messaging, and broadcast, among others.

Modifications, additions, or omissions may be made to the communication system 100 without departing from the scope of the present disclosure. For example, although there are only one AP and three communication devices shown in FIG. 1, the number of APs, the number of communication devices included in the communication system 100 are not limited.

Recently, the Federal Communications Commission (FCC) approved the use of the 6 GHz frequency band for wireless communication (e.g., Wi-Fi or similar broadband technology) with unlicensed devices on the condition that unlicensed devices do not interfere with devices (also referred to as licensed devices) that have received licenses to use the 6 GHz band. The 6 GHz frequency band is a spectrum of radio frequencies ranging from 5.925 GHz to 7.125 GHz (or 101-a0 MHz of spectrum). This spectrum addition to wireless capability is an expansion that adds upwards of one hundred channels for unlicensed devices to utilize.

The FCC has issued a mandate that 6 GHz access points (AP) obtain authorization from an automated frequency coordination (AFC) system (e.g., AFC system, such as AFC server, in the region) before operating in a standard power (SP) mode (e.g., mode that generates a maximum transmission power of 36 dBm). In some circumstances, an AP may send an AFC inquiry request, for example, a channel availability request, including operational characteristics of the AP. The operational characteristics may include, for example, a geolocation, a location confidence, an antenna height, an FCC ID, a serial number, and/or other device characteristics. The AFC system may determine a predicted interference on an incumbent system based on received operational characteristics, and thereby providing, to the AP, an AFC response, which may also be referred to a response to an AFC inquiry request, AFC request, AFC inquiry or AFC query. The AFC response may include information indicating available frequency spectrum (e.g., available channel) and power constraints thereon for the AP. The power constraint on a channel refers to a threshold operating power (e.g., maximum operating power) for the AP to operate on the channel while located within a geofence. For purpose of obtaining AFC related authorization, the AP is required to obtain its location information, and then reports the location information to the AFC system.

Figure 2:
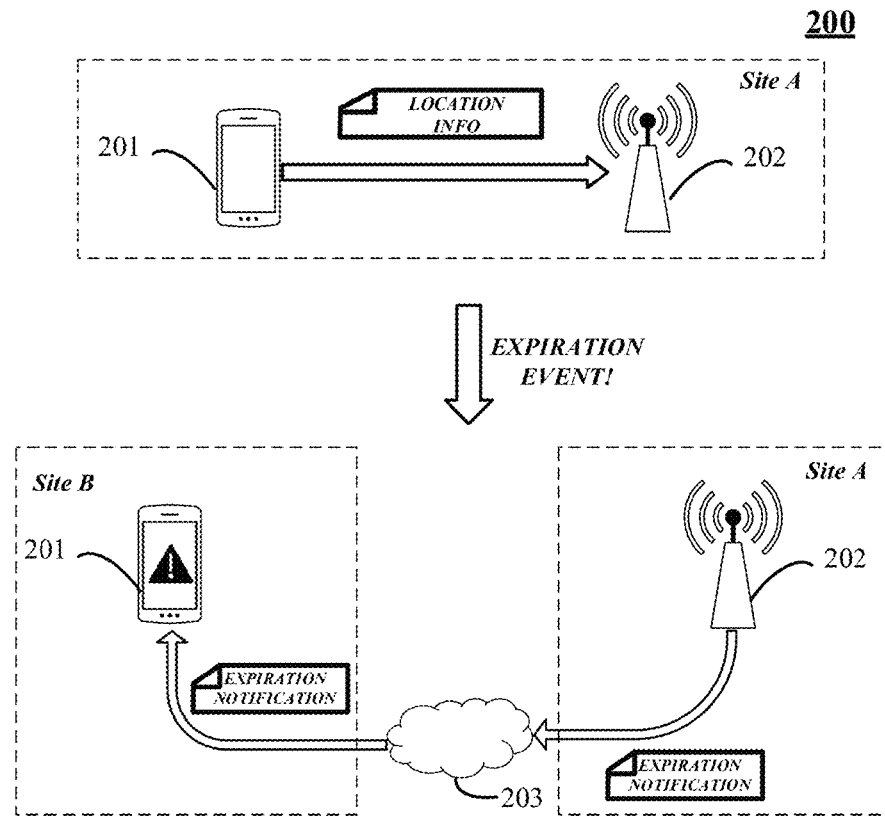
FIG. 2 illustrates an exemplary schematic diagram of obtaining the location information of the AP according to an embodiment of the present disclosure.

FIG. 2 illustrates an exemplary schematic diagram of obtaining the location information of the AP according to an embodiment of the present disclosure.

Due to various reasons including manufacturing cost, device complexity, and power consumption, APs are typically not equipped with positioning circuits (such as GPS circuit). In view of this, the present disclosure addresses the challenge of determining the location of an AP by leveraging client devices in proximity communication with the AP, such as smartphones or tablets, which can provide their own location information (such as GPS information). According to embodiments of the present disclosure, an AP can obtain its location information with the aid of the client device that wirelessly communicates with the AP. For example, the client device provides its location information, such as GPS coordinates, to the AP, which then uses this information to determine its own location. This approach allows the AP to report its location for AFC authentication without the need for built-in GPS or similar positioning circuits.

As illustrated in the upper dashed block of FIG. 2 of the scenario 200, at Site A, a client device 201 may communicate with an AP 202 according to a proximity communication protocol. During the wireless communication, the client device 201 shares its "LOCATION INFO", such as GPS location information, with the AP 202, enabling the AP to determine its own location based on the location of the client device. Various methods can be employed to assist in positioning the AP, which will be described hereinafter. In this way, even without a built-in GPS, the AP can acquire and report its location information for AFC authentication. Herein, the location may refer to geolocation of the AP.

As mentioned above, the AP needs to complete the AFC authentication process by reporting its location to an AFC server to obtain a list of available spectrum resources. Only then is it permitted to switch to the Standard Power (SP) mode, thereby increasing its transmission power. In addition, inventors recognize that if the AP's location information becomes invalid (e.g., due to device reboot or expiration of the location information), the AP must update its location information to re-enable AFC functionality. However, for the approach of positioning the AP with the assistance of a client device, if the client device is not near the AP, the AP cannot update or re-determine its location, and currently there is no mechanism to notify the client device to provide its location information for assisting in the location updating for the AP, preventing reactivation of the AFC functionality. Moreover, due to strict privacy and permission settings of operating systems like Android or iOS on client devices, the client's GPS data cannot be spontaneously uploaded to the AP. It requires the user to trigger the task of location update and location report, and only after the user's triggering action, the client device may obtain its location information by means of APIs in its operating system, such as Android or iOS, and provides the location information to the AP, which will be subsequently used by the AP to determine its own location information for reporting to the AFC server.

As mentioned above, currently, there is no mechanism to notify users of the location information's invalidity, prompting them to enable the repositioning of AP for re-authentication of AFC. As a result, failure to promptly notify the client device of the invalidity leads to the case that the user can only discover the invalid AP location information upon actively accessing the AP management and configuration interface (such as UI) of the AP product. This leads to an undesired delay in reactivating AFC, thereby adversely affecting the user experience.

The present disclosure also proposes monitoring the expiration event of the AP's location information, and providing an expiration notification to the client device upon detection of such an event. This allows users to be timely aware of the AP's invalid location information through the client device and trigger the task of location uploading and updating, thereby re-enabling AFC functionality of the AP.

As shown in the lower two dashed blocks of FIG. 2, at the time of detecting the expiration event, the client device 201 may no longer be at the original Site A and may have moved to Site B, no longer in proximity communication with AP 202. In this case, AP 202 can send an expiration notification to a cloud server 203, which can forward the notification to the client device (e.g., visual, auditory, and tactile prompts on the client device), prompting the user to bring the client device 201 near AP 202 to assist in positioning of the AP 202 such that the updated location information of the AP 202 can be used to re-enable AFC functionality.

It should be noted that, in this example, the cloud server 203 is used to relay the expiration notification when the client device 201 is not near the AP 202 upon detecting the expiration event. However, if the client device 201 is nearby, other proximity communication mechanisms can also be used for notification delivery. Additionally, in this example, the client device that previously provided the location information for assisting in AP positioning and the client device that receives the expiration notification are the same, which corresponds to client device 201 having a binding relationship with the AP 202. Of course, the expiration notification can also be sent to a client device different from the client device that has previously assisted in positioning the AP, as long as it is a bound client device (for example, a user may have multiple portable devices that have been used to assist in AP positioning and can be considered secure bound devices), ensuring security and preventing information leakage.

In this way, when the AP's location information becomes invalid, the expiration notification can be promptly notified to the client device, allowing for timely repositioning and reporting of the updated location as well as re-enabling the AFC functionality, avoiding unnecessary delays due to the user's inability to timely learn of the invalid location information.

In addition, the timing of the expiration notification is more precise (that is, when the AP location information is determined to be invalid), avoiding unnecessary disturbances to the user, as compared to the approaches of frequent periodic alerts.

Figure 3:
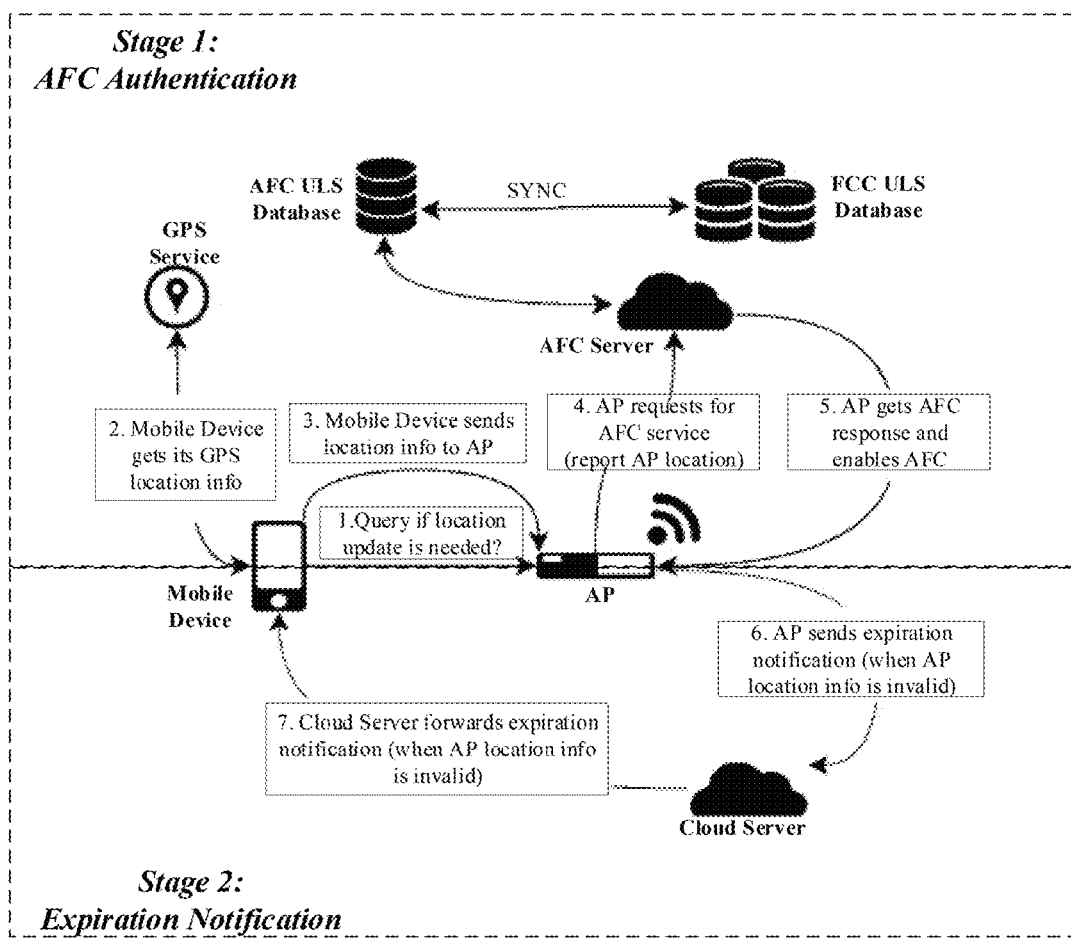
FIG. 3 illustrates an exemplary schematic workflow of the AFC authentication and expiration notification according to an embodiment of the present disclosure.

FIG. 3 illustrates an exemplary schematic workflow of the AFC authentication and the expiration notification according to an embodiment of the present disclosure.

As shown in FIG. 3, the exemplary schematic workflow 300 comprises two stages: Stage 1—AFC Authentication, and Stage 2—Expiration Notification. These stages detail the process by which an AP obtains location information from a mobile device to facilitate enabling the AFC functionality and subsequently notifies the user's mobile device of location information expiration via a remote server, which will be described hereinafter.

At step 1, when a user seeks to activate AFC functionality of the AP, for example, during the initial setup, after the location information has become invalid as described later, or when AFC authorization has not been granted for long, the user may establish a connection between the mobile device and the AP, such as via Wi-Fi and other proximity communication mechanisms, and the mobile devices queries whether location information requires updating.

At step 2, if the mobile device determines that an update of location information for the AP is necessary (indicated by a positive query result returned from the AP, which indicates whether the location information of the AP is valid or not), a functional component installed on the mobile device, such as an application (App), utilizes the device's integrated GPS service to ascertain its current location. For example, the location information may include a longitude, a latitude, a horizontal uncertainty with a confidential level, a height, and a vertical uncertainty with the confidential level for the mobile device.

At step 3, the mobile device transmits its location information (e.g., GPS location information) to the AP, such that the AP may obtain the location information of the mobile device wirelessly coupled to the AP. Accordingly, the AP can determine a location information of the AP based on the obtained location information of the mobile device. For example, the GPS location information of the mobile device can be contained in a data frame transmitted from the client device to the AP during the wireless communication via a secure link.

According to embodiments of the present disclosure, the location information of the AP can be determined by: determining a distance between the AP and the mobile device based on a signal strength therebetween, and determining the location information of the AP based on the location information of the mobile device and the distance. For example, the location information of the AP can be determined based on a weighted sum of the location information of the mobile device and the determined distance, which will be described hereinafter.

At step 4, the AP may establish a secure connection with the AFC Server and accordingly requests for AFC services, e.g., in response to the AP storing no valid AFC authorization. For example, the AP may transmit an AFC inquiry request including the determined location information of the AP to the AFC server. Subsequently, the AFC server consults its AFC Universal Licensing System (ULS) database, which maintains continuous synchronization with the FCC ULS database.

At step 5, the AFC server provides the result of the AFC inquiry request, including available spectrum-power information, to the AP, thereby enabling the AFC functionality.

For example, the AP may receive the AFC response from the AFC server, which indicates available frequency spectrum and power constraints thereon for the AP. In the present disclosure, the available frequency spectrum comprises available frequency ranges and/or available channels. Subsequently, the AP may control a power mode of the AP (such as SP mode mentioned above) based on the power limitations of the AFC response, to enable the AFC functionality.

The specific operations of the AFC authentication stage (i.e., Stage 1) have been described above, more detailed descriptions will be described hereinafter in FIG. 4.

At step 6, the AP may monitor for the expiration event, and in response to detecting the expiration event (i.e., determining that the location information of the AP is invalid), the AP may transmit a notification (i.e., the expiration notification) indicating the invalidity of the location information of the AP to one or more client devices bound to the AP. In the present disclosure, the expiration event can be identified by determining that the location information of the AP exceeds a valid time duration, or determining that the AP has been restarted.

According to the present disclosure, the client device of which the location information was previously obtained in Stage 1 is one of client devices bound to the AP involved in Stage 2. In this example, the user uses the same mobile device not only to provide the location information for initial positioning of the AP for enabling AFC functionality, but also to receive the expiration notification and provide the location information again for updated positioning of the AP and re-enabling AFC functionality. For example, the notification includes a prompt to move one of the one or more client device near the AP to trigger a repositioning of the AP, such that the AFC functionality can be re-enabled It should be noted that in the example of FIG. 3, when the AP's location information becomes invalid due to factors such as device reboot or expiration of the location data, the AP sends the expiration notification to the cloud server, such that the cloud server may forward the notification to the one or more client devices bound to the AP.

At step 7, the cloud server may forward the notification to the one or more client devices bound to the AP, as mentioned above. This approach of the delivery for the expiration notification is especially useful when the mobile device is out of range for proximity communication with the AP, otherwise, the user may not be timely aware of the notification.

It should be noted that after the user checks the notification on his or her mobile device, the user may bring the mobile device near to the AP, such that the AP can be re-positioned based on the information provided by the mobile device again, and the updated location information can be used for AFC authentication again to re-enable AFC functionality. For example, after determining that the location information of the AP is invalid and after the user has taken the client device near to the AP according to the prompt information indicated by the notification, the user has the option to return to the vicinity of the AP, updating the AP's location information as previously described. In other words, the steps 1-5 of Stage 1 will be performed again for re-positioning AP and re-enabling AFC functionality. This process realizes remote notification and subsequent reactivation of AFC functionality post-expiration.

For example, the location information of the AP will be redetermined based on the location information of the client device, and a new AFC inquiry request including the redetermined location information of the AP will be transmitted to the AFC server. Accordingly, a new AFC response will be provided from the AFC server, and the new AFC response indicates available frequency spectrum and power constraints thereon for the AP determined based on the redetermined location information of the AP, such that the AP may control the power mode of the AP based on the newly provided AFC response.

The specific operations of the expiration notification stage (i.e., Stage 2) have been described above, more detailed descriptions will be described hereinafter in FIG. 5.

Figure 4:
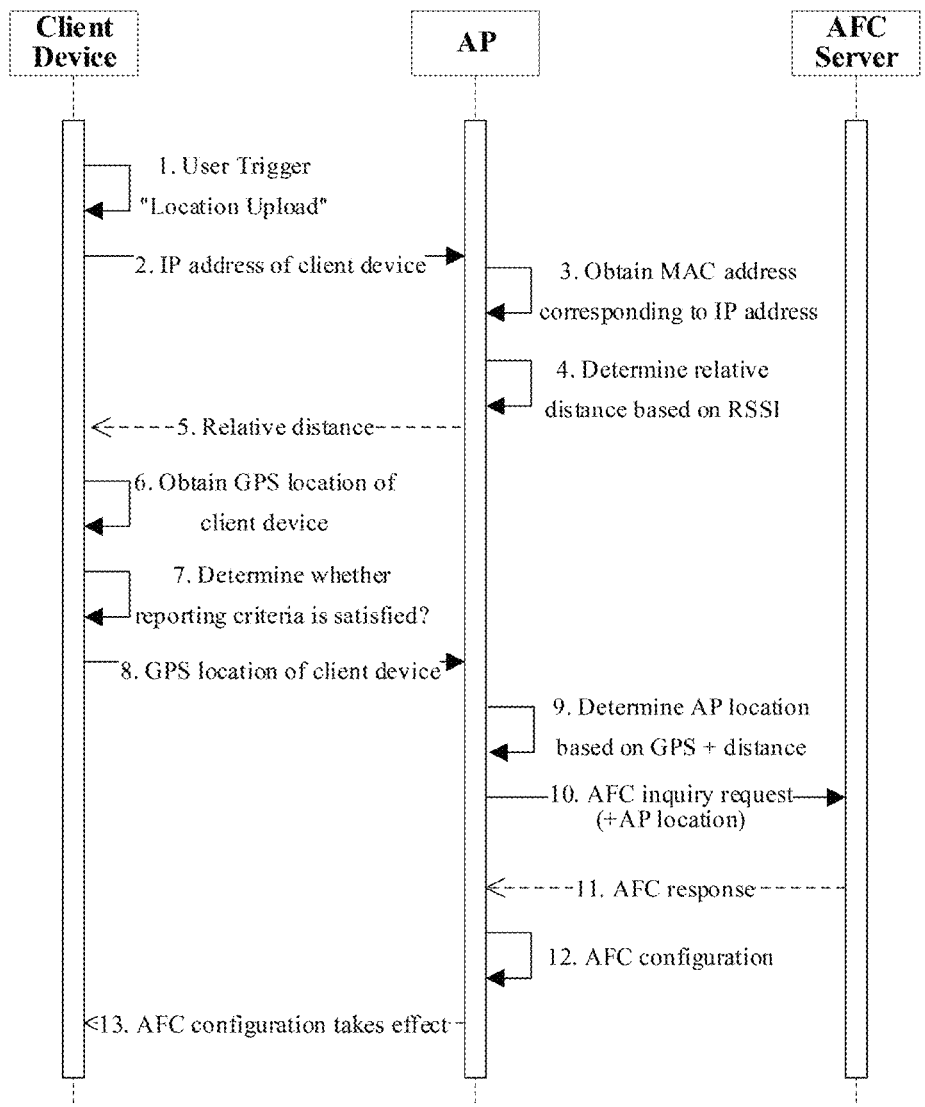
FIG. 4 illustrates an exemplary schematic diagram of message flow involved in the AFC authentication stage according to an embodiment of the present disclosure.

FIG. 4 illustrates an exemplary schematic diagram of message flow involved in the AFC authentication stage according to an embodiment of the present disclosure.

In this embodiment, the message flow 400 involved in the AFC authentication stage is basically the same as the operations described in combination with FIG. 3, and details for the same operations are omitted here. The distinctions between FIG. 3 and FIG. 4 lie in that the location information of the client device is selectively provided to the AP based on the relative distance between the client and the AP, potentially incorporating additional factors.

At step 1, the user initiates or triggers the location upload process on the client device, triggering a sequence of following operations.

At step 2, during the proximity communication between the client device and the AP, the AP determines the IP address of the client device from the incoming messages.

At step 3, the AP acquires the MAC address corresponding to the IP address.

At step 4, the AP determines the distance between itself and the client device based on the Received Signal Strength Indicator (RSSI) of the uplink signal associated with the MAC address of the client device, such as based on a free space attenuation model. It is understood that while this example is based on RSSI, other principles could be applied, such as the power information of the received signal or the time of flight (ToF) of the signal.

At step 5, the AP communicates the determined relative distance to the client device.

At step 6, the client device obtains its current GPS location.

At step 7, the client device determines whether the GPS location information of the client device should be reported based on established criteria.

According to embodiment of the present disclosure, the location information of the client device is provided based on a comparison between the determined distance and a threshold distance. According to this embodiment, if the relative distance is excessive (for example, greater than 50 meters, though the threshold can be selected as other values based on practical conditions), the potential error for the measured relative distance may be significant. Consequently, the AP's position, calculated based on the GPS location of the client device and the measured relative distance, may also be inaccurate, possibly exceeding the tolerance of error allowed by the AFC server. In such cases, it may be advisable to withhold the location information from being reported, as reporting it might lead to an unsuccessful AFC authorization due to excessive error. Optionally, the client device may prompt the user with a message such as "Please move the client device closer to obtain a more accurate measurement result". Additionally, the potential error in mobile device's positioning can also be considered when deciding whether to report the obtained GPS data of the client device to the AP.

In this way, a filtering mechanism is applied to selectively refrain from reporting the client device's location when the predicted error in relative distance (and possibly in combination with the client device's positioning error) is likely to exceed the permissible error limits in the AFC certification process. This approach prevents the engagement of unnecessary certification processes and communication resources for predicted failed AFC certifications.

At step 8, upon it is determined that the reporting criteria can be satisfied, the GPS information of the client device is reported to the AP.

At step 9, the AP calculates its location information based on the client device's GPS information and the measured relative distance.

At step 10, the AP sends an AFC query request that at least includes the determined AP location information.

At step 11, the AP receives an AFC response that indicates available frequency spectrum and power constraints thereon for the AP.

At step 12, based on the AFC response, the AP configures itself for AFC-related settings, including the adjustment of power modes to facilitate a power boost.

At step 13, the AFC configuration takes effect between the client device and the AP.

This implementation ensures that the location information of the client device is selectively reported only when it is likely to meet the accuracy requirements of the AFC process, thereby enhancing the efficiency and reliability of the AFC certification process.

Figure 5:
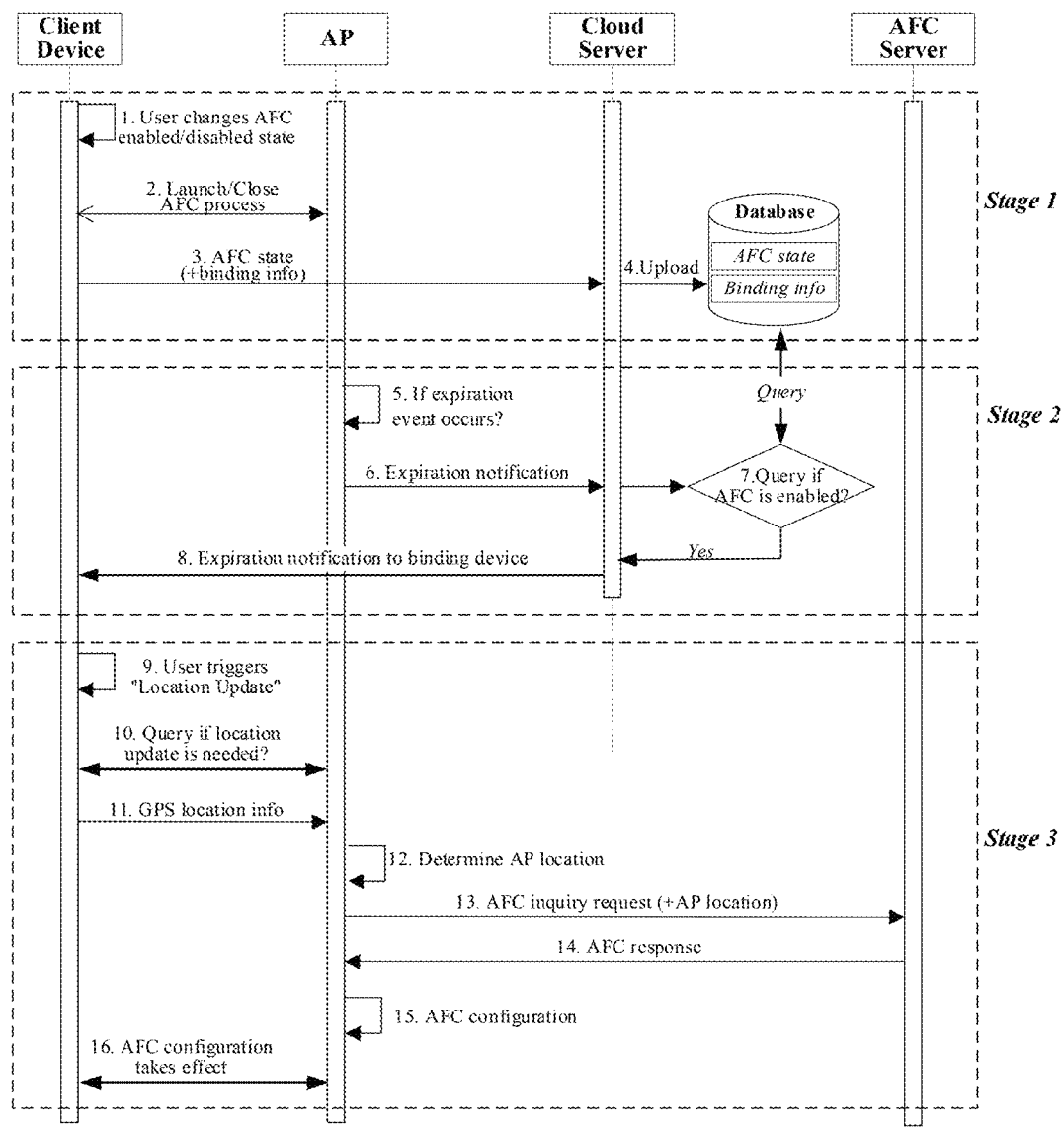
FIG. 5 illustrates an exemplary schematic diagram of message flow associated with the expiration notification stage according to an embodiment of the present disclosure.

FIG. 5 illustrates an exemplary schematic diagram of message flow associated with the expiration notification stage according to an embodiment of the present disclosure.

As shown in FIG. 5, the message flow 500 depicted in FIG. 5 expands upon the Stage 2 outlined in FIG. 2, and the Stage 2 of FIG. 5 is basically same as the Stage 2 of FIG. 2, but added with more details for the delivery of the expiration notification. Furthermore, FIG. 5 illustrates two more stages associated with the delivery of the expiration notification, that is, Stage 1 related to binding relationship and AFC state recording, and Stage 3 related to re-positioning of the AP and re-enabling of the AFC functionality.

The purpose of Stage 1 of FIG. 5 is to pre-record the AFC enablement status of each of multiple APs and to store the binding relationships between these APs and their corresponding client devices. This allows for the efficient use of pre-recorded information to make decisions on whether client devices need to be notified of the expiration and, if so, which specific client device(s) should receive the notification, in the event of the AP location information becoming invalid.

At step 1, the user may change the AFC enablement status (enabled or disabled) depending on whether the user wants to use the AFC functionality on the AP product or not, for example, by using an UI provided at the client device, thereby selecting to activate or deactivate the AFC functionality for his or her AP product.

At step 2, in response to the user's setting in step 1, the AFC process is launched or closed between the client device and the AP to modify the AP's AFC status value, reflecting either an enabled or disabled state for the AP.

At step 3, the client device communicates the AFC enablement status to the cloud server, for example, in a data frame, and the data frame may also carry the binding relationship between the client device and the AP.

At step 4, the cloud server uploads the AFC enablement status (e.g., enabled or disabled) provided by the client device and the binding relationship between the client device and the AP in a database for subsequent queries.

According to the present disclosure, the database may store a binding relationship between multiple APs (including the AP depicted in FIG. 5) and their corresponding client devices. Also, the database is further configured to store an AFC enabled or disabled state for each of the multiple APs for determining whether to transmit the expiration notification.

Next, the message flow 500 proceeds to Stage 2 related to the expiration event monitoring and the expiration notification transmission.

At step 5, the AP continuously monitors for the occurrence of expiration events.

At step 6, upon detection of an expiration event, the AP sends an expiration notification to the cloud server.

At step 7, the cloud server queries the database to determine whether the notification needs to be forwarded and to determine the destination of such forwarding.

According to embodiments of the present disclosure, the cloud server checks the AFC status (e.g., enabled or disabled) stored in the database for the AP to be confirmed. If the status is enabled, it confirms the necessity to notify the user's client device to reactivate the AFC functionality. Conversely, if the status is disabled, there is no need to notify the event as the AP does not require AFC functionality, and thus, no expiration notification is necessary. Additionally, upon confirming the need to send an expiration notification, the cloud server queries the database to identify the client devices bound to the AP to determine the recipients of the expiration notification.

In this manner, the database is accessible by multiple APs for storing information about whether their AFC functionalities are enabled, as well as their associated bound client devices. Accordingly, should any AP detect that its location information has become invalid, it can consult the database to determine whether a notification is necessary and identify the client device to which the notification should be directed. This approach prevents the unnecessary sending of expiration notifications to APs that have not activated AFC features. Furthermore, when a notification is required, it can be accurately delivered only to the bound client device, ensuring precise information dissemination to prevent any undesired interference with other devices (in case that unintended client devices receive the expiration notifications) and preventing information leakage. Also, due to the existence of binding relationships, third parties are unable to transmit forged data.

At step 8, in response to determining that the expiration notification needs to be transmitted and determining the destination of the notification, the cloud server transmits the expiration notification to the identified bound client device (s).

It can be understood that the number of bound client devices is configurable by the user, which may be limited to only the last client device that was used by the user for the AFC-related settings (such as the above-mentioned positioning related operations), or it may encompass multiple client devices that have been frequently used by the user for AFC-related settings and are thereby considered secure client devices. The present disclosure does not limit the quantity of bound client devices, as long as they are secure and trusted client device.

Next, the message flow 500 proceeds to Stage 3 related to the re-determination of position of the AP and the re-enabling of the AFC functionality. As shown in FIG. 5, Stage 3 can be initiated after the client device has been notified of the location invalidation and the user agrees to upload and update the location for re-positioning of the AP. This stage involves the process of re-determining the AP's position and re-enabling the AFC functionality.

At step 9, if the user is far away from the AP upon receiving the expiration notification, the use may follow the guidance provided in the notification to return to the vicinity of the AP and proactively initiate tasks for location update and upload.

At step 10, the client device queries the AP whether a location update is required. In this scenario, given the prior receipt of an expiration notification, it can be affirmed that a location update is necessary.

At step 11, upon confirmation of the AP's need for location update, the client device transmits its GPS location information to the AP for re-determination of the AP's location.

At step 12, the AP, leveraging the GPS location information received from the client device and the relative distance measured based on RSSI, re-determines the AP's location.

At step 13, the AP sends a new AFC query request that encompasses the newly determined AP location information to the AFC server.

At step 14, the AP receives a new AFC response from the AFC server, as a response to the new AFC query request.

At step 15, guided by the new AFC response, the AP proceeds with the AFC-related configuration, including the adjustment of power modes to facilitate a power boost.

At step 16, the AFC configuration takes effect, such as by the AP selecting a channel to be used for the communication between the AP and the client device.

This implementation ensures a streamlined and efficient process for managing the AFC functionality and repositioning of APs, minimizing service interruptions and enhancing the user experience by timely notifying the user of the expiration of the AP location information.

Figure 6:
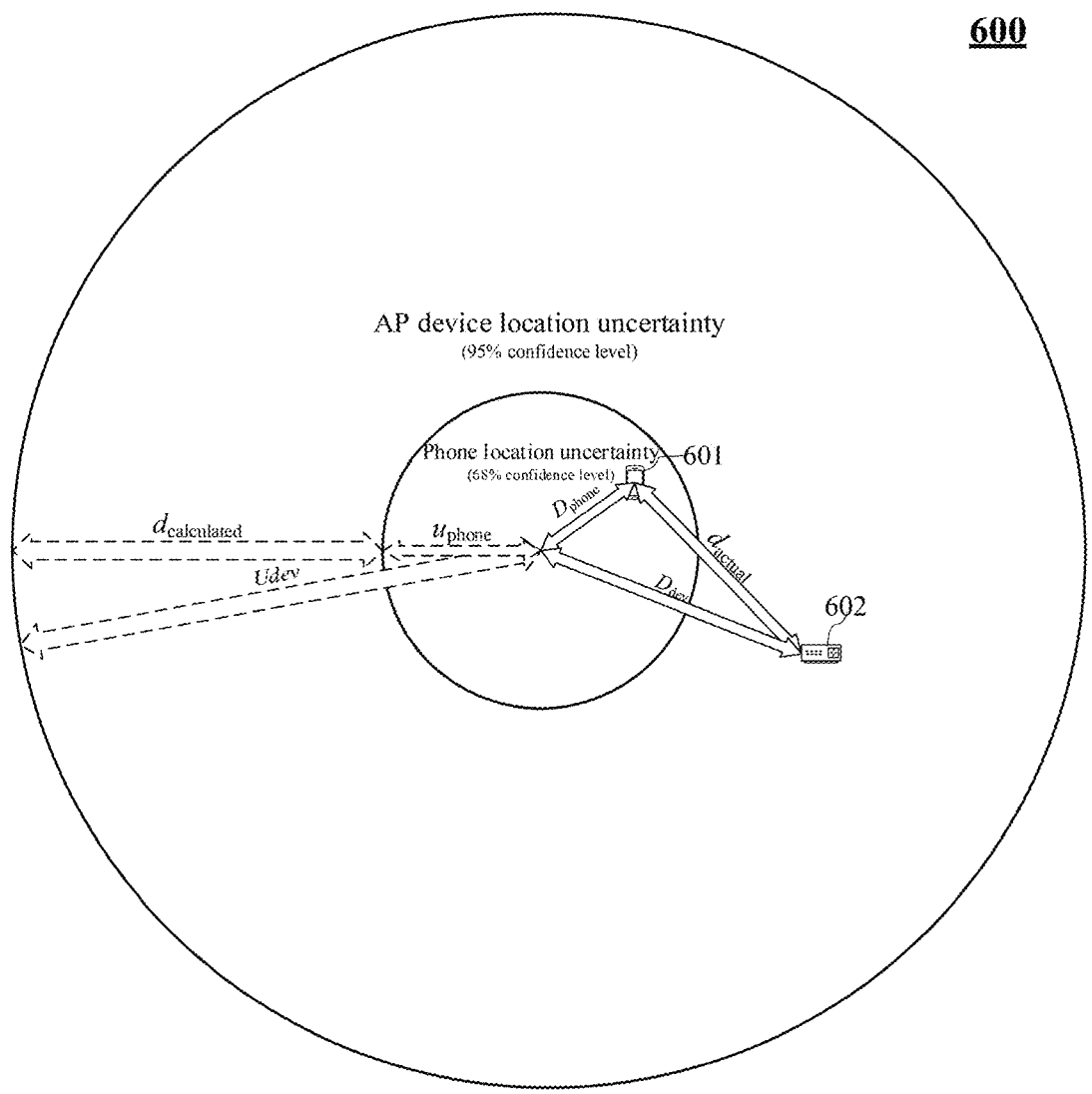
FIG. 6 illustrates an exemplary schematic diagram of determining the location information of the AP according to an embodiment of the present disclosure.

FIG. 6 illustrates an exemplary schematic diagram of determining the location information of the AP according to an embodiment of the present disclosure. Specifically, FIG. 6 shows relationship between the uncertainties of the AP and client device according to an embodiment of the present disclosure, which will be described hereinafter.

As mentioned above, the AP may receive location information of a client device (e.g., mobile phone or mobile device as described above) wirelessly coupled to the AP. In some embodiments, the location information of the client device may include a horizontal location and a vertical location (e.g., height), and the horizontal location may include longitude and latitude. In some embodiments, the location information may include a first location uncertainty with a first confidence level. Herein, the first location uncertainty refers to the location uncertainty of the client device, and the first confidence level refers to the confidence level for the location of the client device. The confidence level represents a degree to which the real value of the location has a certain probability of falling around the measured value of the location. The location uncertainty refers to an uncertain extent of a location and may represent an interval. The lower the location uncertainty, the higher the quality of the location. Therefore, the location uncertainty can be used to evaluate reliability of a location and thus increase comparability between locations.

Those skilled in the art should know that the client device may obtain its location with a certain confidence level. The confidence level may also be referred to as confidence level herein. As an example, a mobile phone can obtain its location information by means of APIs in its operating system, such as Android or iOS, and the location information may have a confidence level of 68%, such as APIs getAccuracy and getMslAltitudeAccuracyMeters. According to the above introductions, it can be known that, in some embodiments, the first location uncertainty with the first confidence level may include a first horizontal uncertainty with the first confidence level and a first vertical uncertainty with the first confidence level.

Next, the AP may also determine a distance between the AP and the client device. The distance may be determined based on various principles, such as power information of the received signal, time of fly (ToF) of the signal, etc.

Next, the AP may determine the location information of the AP based at least on the distance and the location information of the client device. In some application scenarios, the AP needs a location uncertainty, which may be different from that can be provided by the client device. For example, the AFC system requires the AP to provide its location with a confidence level of 95%, whereas a mobile phone can obtain its location with a confidence level of 68%, as mentioned above. It should appreciate that the confidence level about the location information that the AP requires may be different according to actual application, and on the other hand the client device may obtain its location with different confidence levels depending on device type or means for obtaining the location etc. In some embodiments, determining the location information of the AP may comprise determining, based on the distance and the first location uncertainty, a second location uncertainty with a second confidence level as at least a portion of the location information of the AP. Herein, the second location uncertainty refers to the location uncertainty of the AP, and the second confidence level refers to the confidence level for the location of the AP.

Similar to the first location uncertainty, the second location uncertainty may include a second horizontal uncertainty with the second confidence level and a second vertical uncertainty with the second confidence level.

As mentioned above, the client device may be configured to communicate with the AP using a wireless proximity communication protocol, this represents that the client device is within the communication range of the wireless proximity communication protocol, i.e., being close to the AP. Thus, in some embodiments, the location information of the AP may include a horizontal location and a vertical location. In some embodiments, determining the location information of the AP may include determining the horizontal location of the client device wireless coupled to the AP as the horizontal location of the AP, and determining the vertical location of the client device as the vertical location of the AP.

As shown in the scenario 600 of FIG. 6, the "AP" 602 as shown in FIG. 6 could be a 6SD device, which refers to Standard Power Devices (SPDs) used in the 6 GHz band and need to comply with specific power limits and operating specifications.

As shown in FIG. 6, there are two circles, wherein radius of the small circle represents the horizontal uncertainty of the measured horizontal location of the client device, which is exemplary shown as a mobile phone 601 in FIG. 6, with a confidence level of 95%, and radius of the big circle represents the horizontal uncertainty of the horizontal location of the AP 602 with a confidence level of 95%. The measured horizontal location of the mobile phone 601 is at the center of the two circles, and the actual horizontal location of the mobile phone 601 has a distance from the measured horizontal location. As mentioned above, the horizontal location may be represented by longitude and latitude. Therefore, the distance $\mathcal{D}$ from the actual horizontal location to the measured horizontal location of the mobile phone 601 can be calculated according to the following equations (1)-(3):

$$\mathcal{L} = L - L_{measured} \quad (1),$$

$$\mathcal{B} = B - B_{measured} \quad (2),$$

$$\mathcal{D} = \sqrt{\mathcal{L}^2 + \mathcal{B}^2} \quad (3),$$

wherein L represents the actual longitude, $L_{measured}$ represents the measured longitude of the mobile phone 601, $\mathcal{L}$ is a random variable representing longitude distance, B represents the actual latitude, $B_{measured}$ represents the measured latitude of the mobile phone 601, and $\mathcal{B}$ is a random variable representing latitude distance.

Since the random variables $\mathcal{L}$ and $\mathcal{B}$ are independent in two-dimensional plane and both comply with the normal distribution N with deviation $\sigma^2$, the distance $\mathcal{D}$ complies with Rayleigh distribution.

For the mobile phone 601, the random variables representing longitude and latitude distances of the mobile phone 601 can be calculated according to the equations (4)-(5):

$$\mathcal{L}_{phone} = L_{phone} - L_{measured} \quad (4),$$

$$\mathcal{B}_{phone} = B_{phone} - B_{measured} \quad (5),$$

wherein $L_{phone}$ represents the actual longitude of the mobile phone, $L_{measured}$ represents the measured longitude of the mobile phone, $\mathcal{L}_{phone}$ is a random variable representing longitude distance of the mobile phone 601, $B_{phone}$ represents the actual latitude of the mobile phone 601, $B_{measured}$ represents the measured latitude of the mobile phone, and $\mathcal{B}_{phone}$ is a random variable representing latitude distance of the mobile phone 601.

The random variables $\mathcal{L}_{phone}$ and $\mathcal{B}_{phone}$ are independent and both comply with the normal distribution of N(0, $\sigma_{phone}^2$), wherein $\sigma_{phone}$ represents normal distribution standard deviation for the random variables $\mathcal{L}_{phone}$ and $\mathcal{B}_{phone}$. Therefore, the cumulative distribution function for the distance $\mathcal{D}_{phone}$ between the actual and measured horizontal locations of the mobile phone 601 should be the following equation (6):

$$F_{\mathcal{D}_{phone}}(d) = P(\mathcal{D}_{phone} < d) = 1 - \exp\left(-\frac{d^2}{2\sigma_{phone}^2}\right), d > 0 \quad (6)$$

wherein P represents probability, and d is an independent variable representing the distance between two horizontal locations. The cumulative distribution function for the distance $\mathcal{D}_{phone}$ may represent the probability that the actual horizontal location of the mobile phone 601 is within a circle with ($L_{measured}$, $B_{measured}$) as the center and d as the radius. The cumulative distribution function for the distance $\mathcal{D}_{phone}$ under the uncertainty $u_{phone}$ of the horizontal location of the mobile phone 601 can be expressed by the following equation (7):

$$P(\mathcal{D}_{phone} < u_{phone}) = F_{\mathcal{D}_{phone}}(u_{phone}) \quad (7).$$

In general, the uncertainty $u_{phone}$ of the horizontal location with a confidence level can be calculated according to the condition that the cumulative distribution function for the distance $\mathcal{D}_{phone}$ under the uncertainty $u_{phone}$ conform to the confidence level.

This confidence level represents a probability that the mobile phone 601 is within the circle with ($L_{measured}$, $B_{measured}$) as the center and uncertainty $u_{phone}$ as the radius. As shown in FIG. 6, the small circle has a center of ($L_{measured}$, $B_{measured}$) and a radius of $u_{phone}$, and the probability that the mobile phone 601 is within the small circle is 95%, i.e., the confidence level is 95%.

As mentioned above, the mobile phone can obtain its location information having a confidence level of 68%, the AFC system requires the AP to provide its location with a confidence level of 95%. In order to conform to the requirement of the AFC system, the confidence level of 68% should be convert to 95%, that is, the radius of the circle will become greater. Supposing the uncertainty $u_{phone}$ of the horizontal location of the mobile phone 601 as $u_{phone,68}$ and $u_{phone,95}$ under the confidence levels of 68% and 95%, respectively, according to Rayleigh distribution, $u_{phone,68}$ and $u_{phone,95}$ comply with the following equation (8):

$$\begin{cases} 1 - \exp\left(-\dfrac{u_{phone,68}^2}{2\sigma_{phone}^2}\right) = 0.68 \\ 1 - \exp\left(-\dfrac{u_{phone,95}^2}{2\sigma_{phone}^2}\right) = 0.95 \end{cases} \quad (8)$$

The equation (8) can be solved to obtain the following equation (9):

$$u_{phone,95} = \sqrt{\log_{0.32} 0.05} \, u_{phone,68} = 1.6215 \cdot u_{phone,68} \quad (9),$$

wherein 1.6215 is a horizontal coefficient for converting from the confidence level of 68% to the confidence level of 95% with Rayleigh distribution.

In addition, as shown in FIG. 6, an actual horizontal distance $d_{actual}$ represents the actual horizontal location of the AP 602 to the actual horizontal location of the mobile phone 601, and a distance $D_{dev}$ represents the actual horizontal location of the AP 602 to the measured horizontal location of the mobile phone 601. The distance $D_{dev}$ may be the maximum value of the actual horizontal distance $d_{actual}$ under the confidence level of 95%. Therefore, an uncertainty of the assumed horizontal location of the AP 602 with the confidence level of 95% should further consider the distance $D_{dev}$. For example, the uncertainty $u_{dev,95}$ of the horizontal location of the AP 602 under the confidence level of 95% can be calculated according to the following equation (10):

$$u_{dev,95} = d_{calculated} + u_{phone,95} \quad (10),$$

wherein $d_{calculated}$ represents the calculated distance from the AP 602 to the mobile phone 601. The calculated distance $d_{calculated}$ should take the maximum value to consider the most conservative situation, to ensure the uncertainty conform to the required confidence level. Substituting equation (9) into equation (10), the equation (11) is obtained:

$$u_{dev,95} = d_{calculated} + 1.6215 \cdot u_{phone,68} \quad (11).$$

As shown in FIG. 6, there is probability of 95% (i.e., confidence level) that the AP 602 is within the circle with ($L_{measured}$, $B_{measured}$) as the center and uncertainty $u_{dev,95}$ as the radius, i.e., the big circle in FIG. 6.

The above describes calculation of the horizontal uncertainty of the AP with respect to FIG. 6, similar calculation applies to the vertical uncertainty of the AP. As mentioned above, the location information of the AP includes a vertical location, for example height, and the vertical location of the client device is determined as the vertical location of the AP. The actual vertical location of the mobile phone 601 has a distance from the measured vertical location. The vertical distance $D_v$ from the actual vertical location to the measured vertical location of the mobile phone 601 can be calculated according to the following equation (12):

$$D_v = H_{phone} - H_{measured} \quad (11),$$

wherein $H_{phone}$ represents the actual height of the mobile phone 601, and $H_{measured}$ represents the measured height of the mobile phone 601. The vertical distance $D_v$ complies with the normal distribution of $N(0, \sigma_{phone}^2)$, wherein $\sigma_{phone}$ represents normal distribution standard deviation for the vertical distance $D_v$ under the confidence level for the uncertainty of the vertical location of the mobile phone 601. The confidence level may represent the probability that the actual vertical location of the mobile phone 601 is within an interval with $H_{measured}$ as the center and uncertainty $v_{phone}$ of the vertical location of the mobile phone 601 as the radius. The uncertainty $v_{phone}$ of the vertical location of the mobile phone 601 could be represented by the distance to the measured height $H_{measured}$ of the mobile phone 601.

Supposing the uncertainty $v_{phone}$ of the horizontal location of the mobile phone 601 as $v_{phone,68}$ and $u_{phone,95}$ under the confidence levels of 68% and 95%, respectively, according to normal distribution, $v_{phone,68}$ and $v_{phone,95}$ comply with the following equation (12):

$$v_{phone,95} = 2 \cdot v_{phone,68} \quad (12).$$

wherein 2 is a vertical coefficient for converting from the confidence level of 68% to the confidence level of 95% with normal distribution. The uncertainty $v_{dev,95}$ of the vertical location of the AP 602 under the confidence level of 95% can be calculated according to the following equation (13):

$$v_{dev,95} = d_{calculated} + v_{phone,95} \quad (13),$$

wherein $d_{calculated}$ represents the calculated distance from the AP 602 to the mobile phone 601. The calculated distance $d_{calculated}$ should take the maximum value to consider the most conservative case, to ensure the uncertainty conform to the required confidence level. Substituting equation (12) into equation (13), the equation (14) is obtained:

$$v_{dev,95} = d_{calculated} + 2 \cdot v_{phone,68} \quad (14).$$

Therefore, there is probability of 95% (i.e., confidence level) that the AP 602 is within the interval with $H_{measured}$ as the center and uncertainty $v_{dev,95}$ as the radius.

Although the above description is based on the assumption that the mobile phone obtains its location information having a confidence level of 68%, and the AP is required to provide its location with a confidence level of 95%, those skilled in the art would appreciate that the confidence level of the location information obtained by the mobile phone and the confidence level of the location information required by the AP could be other values due to various reasons. Therefore, the description with reference to FIG. 6 could be extended to general situations.

The mobile phone could obtain its location information, for example including ($L_{phone}$, $B_{phone}$, $u_{phone,t}$, $H_{phone}$, $v_{phone,t}$), wherein $L_{phone}$ represents the measured longitude of the mobile phone, $B_{phone}$ represents the measured latitude of the mobile phone, $u_{phone,t}$ represents the horizontal uncertainty of the mobile phone with the confidential level t, $H_{phone}$ represents the measured height of the mobile phone, and $v_{phone,t}$ represents the vertical uncertainty of the mobile phone with the confidential level t. The AP may determine its location information from the location information of the mobile phone, the location information of the AP may include for example ($L_{dev}$, $B_{dev}$, $u_{dev,s}$, $H_{dev}$, $v_{dev,s}$), wherein $L_{dev}$ represents the longitude of the AP, $B_{dev}$ represents the latitude of the AP, $u_{dev,s}$ represents the horizontal uncertainty of the AP with the confidential level s, $H_{dev}$ represents the height of the AP, and $v_{dev,s}$ represents the vertical uncertainty of the AP with the confidential level s. Based on the description above, the location information ($L_{dev}$, $B_{dev}$, $u_{dev,s}$, $H_{dev}$, $v_{dev,s}$) of the AP could be determined based on the location information ($L_{phone}$, $B_{phone}$, $u_{phone,t}$, $H_{phone}$, $v_{phone,t}$) of the mobile phone and the calculated distance $d_{calculated}$ between the mobile phone and the AP according to five equations (15)-(19) as follows:

$$L_{dev} = L_{phone} \tag{15}$$

$$B_{dev} = B_{phone} \tag{16}$$

$$H_{dev} = H_{phone} \tag{17}$$

$$u_{dev,s} = d_{calculated} + \lambda_{t,s} \cdot u_{phone,t} \tag{18}$$

$$v_{dev,s} = d_{calculated} + \tau_{t,s} \cdot v_{phone,t} \tag{19}$$

wherein $\lambda_{t,s}$ represents a horizontal coefficient for converting the confidential level t to the confidential level s, and $\tau_{t,s}$ represents a vertical coefficient for converting the confidential level t to the confidential level s. Those skilled in the art should appreciate that modifications to equations (15)-(19) can be made as appropriate, for example, addition of constants, coefficients, etc.

It can be seen that before determining the uncertainties of the AP, it is required to estimate the distance between the mobile phone and the AP. There are various approaches to calculate the distance between two client devices, for example a mobile phone and an AP, using received signal strength indicator (RSSI) or ToF, among others.

In some embodiments, the mechanism for determining the distance between the mobile phone and the AP using ToF may refer to fine time measurement (FTM) mechanism. In some embodiments, the FTM mechanism may conform to 802.11az protocol. In some embodiments, the distance between the mobile phone and the AP may be determined based on a measured ToF during which a signal transmits between the mobile phone and the AP. For example, the distance can be obtained by multiplying ToF by the speed of light. In some embodiments, the distance may be average value of a plural obtained distances.

In some embodiments, the distance between an AP and a client device may be determined based at least on a measured signal strength of a signal received from the client device. In some embodiments, the measured signal strength may refer to RSSI among others. In some embodiments, the measured signal strength may be an average signal strength of a plurality of signals received from the client device.

Figure 7:
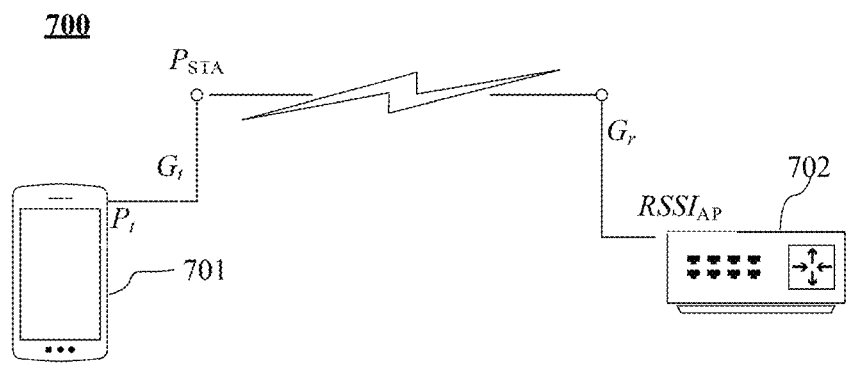
FIG. 7 illustrates an exemplary schematic diagram of the signal strength between the AP and the client device according to an embodiment of the present disclosure.

FIG. 7 illustrates an exemplary schematic diagram of the signal strength between the AP and the client device according to an embodiment of the present disclosure. In some embodiments, the AP device 702 may refer to standard power device.

In practical scenarios, since it is unclear whether there are obstacles between the mobile phone and the AP, in order to ensure that the distance estimated is greater than the actual distance between the mobile phone and the AP and to avoid affecting the confidence of the location uncertainties, when calculating the distance based on RSSI, it is assumed that there is no obstacles between they and LOS free space attenuation model is used, that is, the Friis formula is as follows:

$$PL_{FS}(d)|_{dB} = 20\left(\frac{4\pi df}{c}\right) = 20\log_{10}\left(\frac{4\pi}{c}\right) + 20\log_{10}(d) + 20\log_{10}(f) \tag{20}$$

wherein $PL_{FS}(d)$ represents the power loss in unit of dBm, d represents the distance between the transmitter and the receiver in unit of meter, f represents the communication frequency in unit of Hz, and c represents the speed of light in unit of m·s$^{-1}$.

As shown in the scenario 700 of FIG. 7, the mobile phone 701 has a transmit power $P_T$ of the transmitter, which is amplified with a transmitter antenna gain $G_t$ to obtain a transmit power $P_{STA}$ of the mobile phone 701. The signal would have power loss passing from the mobile phone 701 to the AP device 702. The signal with the power loss would be detected by the receiver antenna of the AP device 702 with a receiver antenna gain $G_r$, to obtain a signal strength measured $RSSI_{AP}$ by the AP device 702. Since the mobile phone 701 cannot obtain RSSI, the actual measured path loss PL can be calculated according to equation (21) as follows:

$$PL = P_{STA} + G_r - RSSI_{AP} \tag{21}$$

In practice, it is not easily to acquire the transmit power of the mobile phone 701. In the regulation of FCC, the maximum transmit power is limited. Considering the most conservative case, that is, the mobile phone 701 transmits with the maximum transmit power, the path loss would be maximized, and thus the farthest distance of the mobile phone 701 can be calculated under the $RSSI_{AP}$ condition measured by the AP device 702, so as to further calculate the uncertainty of the location information of the AP device 702. In some embodiments, the maximum transmit power of client devices (for example the mobile phone 701 in FIG. 7) in different frequency bands can be used to replace the actual transmit power of the mobile phone, that is, $P_{STA}$ adopts the maximum transmit power of the mobile phone in the current frequency band.

Table 1 shows the maximum transmit power of the mobile phone in different frequency bands as follows:

TABLE 1

The maximum transmit power of the mobile phone

| Frequency band | Frequency range/GHz | The maximum transmit power (EIRP, including gain) /dBm |
| --- | --- | --- |
| 2.4G | 2.4~2.4835 | 30 |
| 5G | band1: 5.15~5.25 | 24 |
|  | band2: 5.25~5.35 | 24 |
|  | band3: 5.47~5.725 | 24 |
|  | band4: 5.725~5.825 | 30 |
| 6G | band5: 5.925~6.425 | 30 |
|  | band6: 6.425~6.525 | 12 |
|  | band7: 6.525~6.875 | 30 |
|  | band8: 6.875~7.125 | 12 |

It can be seen from Table 1, when the mobile phone operates at 2.4G frequency band, the maximum transmit power $P_{STA}$ of the mobile phone would be 30 dBm.

According to equations (20)-(21), the model for distance estimation could be expressed by equation (22) as follows:

$$P_{STA} + G_r - RSSI_{AP} = 20\log_{10}\left(\frac{4\pi}{c}\right) + 20\log_{10}(d) + 20\log_{10}(f) \quad (22)$$

wherein $P_{STA}$ represents the transmit power in unit of dBm, $G_r$ represents the receiver antenna gain of the AP device in unit of dBi, $RSSI_{AP}$ represents the signal strength measured by the AP device in unit of dBm, d represents the distance between the mobile device and the AP device in unit of meter, f represents the communication frequency in unit of Hz, and c represents the speed of light in unit of m·s⁻¹.

The equation for calculating distance d between the mobile device and the AP device could be induced from equation (22) as follows:

$$d = 10^{\frac{P_{STA}+G_r-RSSI_{AP}-20\log_{10}(f)-20\log_{10}\left(\frac{4\pi}{c}\right)}{20}} = \frac{c}{4\pi f} \times 10^{\frac{P_{STA}+G_r-RSSI_{AP}}{20}} \quad (23)$$

Table 2 shows the calculated distance d with $P_{STA}$ of 30 dBm and $G_r$ of 5 dBi as follows:

TABLE 2

Distance/m predicted by Friis formula with reference to $RSSI_{AP}$ in different frequencies

| $RSSI_{AP}$ | Frequency | | | | | |
| --- | --- | --- | --- | --- | --- | --- |
| | 2.402 GHz | 2.483 GHz | 5.150 GHz | 5.850 GHz | 5.925 GHz | 7.125 GHz |
| −10 dBm | 1.767 | 1.710 | 0.824 | 0.726 | 0.717 | 0.596 |
| −15 dBm | 3.143 | 3.040 | 1.466 | 1.290 | 1.274 | 1.060 |
| −20 dBm | 5.589 | 5.407 | 2.607 | 2.295 | 2.266 | 1.884 |
| −25 dBm | 9.939 | 9.615 | 4.636 | 4.081 | 4.029 | 3.351 |
| −30 dBm | 17.674 | 17.098 | 8.243 | 7.257 | 7.165 | 5.958 |
| −35 dBm | 31.430 | 30.404 | 14.659 | 12.905 | 12.742 | 10.596 |
| −40 dBm | 55.891 | 54.067 | 26.068 | 22.949 | 22.658 | 18.842 |
| −50 dBm | 176.741 | 170.976 | 82.434 | 72.570 | 71.651 | 59.584 |
| −60 dBm | 558.906 | 540.673 | 260.678 | 229.486 | 226.581 | 188.701 |
| −70 dBm | 1767.414 | 1709.758 | 824.336 | 725.697 | 716.511 | 595.836 |
| −80 dBm | 5589.055 | 5406.730 | 2606.779 | 2294.856 | 2265.808 | 1884.198 |

It can be seen from Table 2 that as compared with real engineering practice, for the same $RSSI_{AP}$, the distance predicted by Friis formula is much larger than the actual distance between the transmitter antenna and the receiver antenna. Thus, the uncertainty of the location information of the AP device is calculated in the most conservative way.

Figure 8:
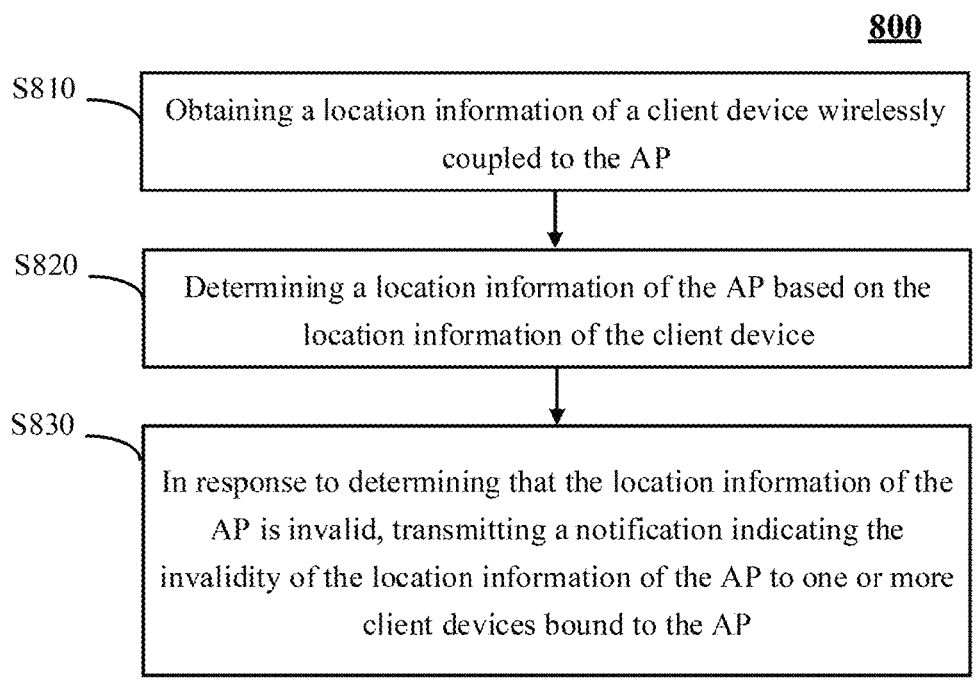
FIG. 8 illustrates a flowchart of a computer-implemented method for positioning of AP according to an embodiment of the present disclosure.

FIG. 8 illustrates a flowchart of a computer-implemented method for positioning of AP according to an embodiment of the present disclosure.

The method may be implemented in the AP and the detailed description of method 800 can refer to the content described in the above with respect to FIGS. 1-7. For example, method 800 can be executed in the architecture described with respect to FIGS. 1-7 and according to the interactions among the client device, AP, cloud server and AFC server as described with respect to FIGS. 1-7. In addition, each step of method 800 can be performed by one or more processing units, such as central processing unit (CPU) of the client device.

With reference to FIG. 8, method 800 comprises steps S810-S830.

At step S810, the AP may obtain a location information of a client device wirelessly coupled to the AP. For example, the location information of the client device includes a longitude, a latitude, a horizontal uncertainty with a confidential level, a height, and a vertical uncertainty with the confidential level for the client device.

At step S820, the AP may determine a location information of the AP based on the location information of the client device. For example, the location information of the AP can be determined by determining a distance between the AP and the client device based on a signal strength between the AP and the client device; and determining the location information of the AP based on the location information of the client device and the distance.

At step S830, in response to determining that the location information of the AP is invalid (such as determining that the location information of the AP exceeds a valid time duration, or that the AP has been restarted), the AP may transmit a notification indicating the invalidity of the location information of the AP to one or more client devices bound to the AP.

According to an embodiment, transmitting the notification to the one or more client devices bound to the AP comprises: transmitting the notification to a cloud server configured to transmit the notification to the one or more client devices bound to the AP.

According to an embodiment, the cloud server is further configured to: access a database storing a binding relationship between multiple APs including the AP and corresponding client devices; and determine the one or more client devices bound to the AP to which the notification is to be transmitted based on the binding relationship.

According to an embodiment, the client device of which the location information is obtained is one of the one or more client devices bound to the AP.

According to an embodiment, the database is further configured to store an AFC enabled or disabled state for each of the multiple APs for determining whether to transmit the notification.

According to an embodiment, the location information of the client device is obtained in response to a query request from the client device.

According to an embodiment, the location information of the AP is determined based on a weighted sum of the location information of the client device and the distance.

According to an embodiment, the method may further comprise: transmitting a first AFC inquiry request including the location information of the AP to an AFC server; and receiving a first AFC response from the AFC server, wherein the first AFC response indicates available frequency spectrum and power constraints thereon for the AP.

According to an embodiment, the method may further comprise: controlling a power mode of the AP based on the power limitations of the AFC response.

According to an embodiment, the location information of the client device is provided based on a comparison between the distance and a threshold distance.

According to an embodiment, the notification includes a prompt to move one of the one or more client device near the AP to trigger a repositioning of the AP.

According to an embodiment, the method may further comprise: redetermining the location information of the AP based on the location information of the client device after determining that the location information of the AP is invalid.

According to an embodiment, the method may further comprise: transmitting a second AFC inquiry request including the redetermined location information of the AP to the AFC server; receiving a second AFC response from the AFC server; and controlling the power mode of the AP based on the second AFC response.

At least based on the above embodiments of the present disclosure, through determining the location information of the AP based on the location information of the client device wirelessly coupled to the AP, the conventional APs without a positioning module can obtain its location information, which may be used to for AFC authentication. Moreover, when the AP's location information becomes invalid, the expiration notification can be promptly notified to the client device, allowing for timely repositioning and reporting of the updated location as well as re-enabling the AFC functionality, avoiding unnecessary delays due to the user's inability to timely learn of the invalid location information.

Figure 9:
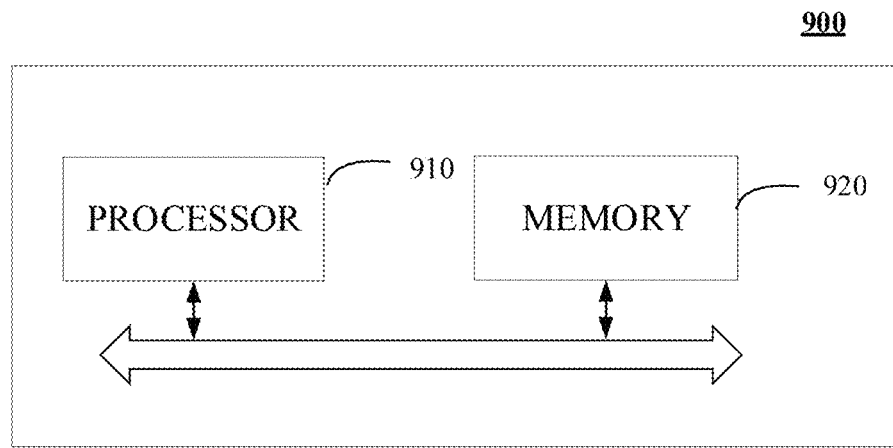
FIG. 9 is an exemplary block diagram illustrating a computing device according to embodiments of the disclosure.

FIG. 9 is an exemplary block diagram illustrating a computing device according to embodiments of the disclosure.

It should be noted that the computing device depicted in FIG. 9 can correspond to one or more of the client device, AP, the cloud server, the AFC server as described in FIGS. 1-8 and can be used to perform the actions involved in the positioning of the AP, for example, the method 800 as described above.

As shown in FIG. 9, the computing device 900 can comprise processor 910 and memory 920. The processor 910 is communicatively coupled with the memory and configured to perform the methods discussed above.

Examples of the processor 910 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 910 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 920.

The memory 920 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 920 may reside in the processor 910, external to the processor 910, or distributed across multiple entities including the processor 910. The memory 920 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for wireless communication is disclosed. As an example, the computer program product comprises a non-transitory computer readable storage medium having program instructions embodied therewith, and the program instructions are executable by a processor. When executed, the program instructions cause the processor to perform one or more of the above-described procedures, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or. The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for positioning performed by an access point (AP), comprising:
   obtaining a location information of a client device wirelessly coupled to the AP;
   determining a location information of the AP based on the location information of the client device; and
   in response to determining that the location information of the AP is invalid, transmitting a notification indicating the invalidity of the location information of the AP to one or more client devices bound to the AP.

2. The method of claim 1, wherein transmitting the notification to the one or more client devices bound to the AP comprises:
   transmitting the notification to a cloud server configured to transmit the notification to the one or more client devices bound to the AP.

3. The method of claim 2, wherein the cloud server is further configured to:
   access a database storing a binding relationship between multiple APs including the AP and corresponding client devices; and
   determine the one or more client devices bound to the AP to which the notification is to be transmitted based on the binding relationship.

4. The method of claim 3, wherein the client device of which the location information is obtained is one of the one or more client devices bound to the AP.

5. The method of claim 3, wherein the database is further configured to store an Automated Frequency Coordination (AFC) enabled or disabled state for each of the multiple APs for determining whether to transmit the notification.

6. The method of claim 1, wherein determining that the location information of the AP is invalid comprises:
   determining that the location information of the AP exceeds a valid time duration; or
   determining that the AP has been restarted.

7. The method of claim 1, wherein the location information of the client device is obtained in response to a query request from the client device.

8. The method of claim 1, wherein the location information of the client device includes a longitude, a latitude, a horizontal uncertainty with a confidential level, a height, and a vertical uncertainty with the confidential level for the client device.

9. The method of claim 8, wherein determining the location information of the AP based on the location information of the client device comprises:
   determining a distance between the AP and the client device based on a signal strength between the AP and the client device; and
   determining the location information of the AP based on the location information of the client device and the distance.

10. The method of claim 9, wherein the location information of the AP is determined based on a weighted sum of the location information of the client device and the distance.

11. The method of claim 9, wherein the location information of the client device is provided based on a comparison between the distance and a threshold distance.

12. The method of claim 1, further comprising:
    transmitting a first Automated Frequency Coordination (AFC) inquiry request including the location information of the AP to an AFC server; and
    receiving a first AFC response from the AFC server, wherein the first AFC response indicates available frequency spectrum and power constraints thereon for the AP.

13. The method of claim 12, further comprising:
    controlling a power mode of the AP based on the power limitations of the AFC response.

14. The method of claim 13, further comprising:
    redetermining the location information of the AP based on the location information of the client device after determining that the location information of the AP is invalid.

15. The method of claim 14, further comprises:
    transmitting a second AFC inquiry request including the redetermined location information of the AP to the AFC server;
    receiving a second AFC response from the AFC server; and
    controlling the power mode of the AP based on the second AFC response.

16. The method of claim 1, wherein the notification includes a prompt to move one of the one or more client device near the AP to trigger a repositioning of the AP.

17. An access point (AP), comprising:
    one or more processors;
    a memory coupled to at least one of the processors; and
    a set of computer program instructions stored in the memory, which, when executed by at least one of the processors, perform actions of:
       obtaining a location information of a client device wirelessly coupled to the AP;
       determining a location information of the AP based on the location information of the client device; and
       in response to determining that the location information of the AP is invalid, transmitting a notification indicating the invalidity of the location information of the AP to one or more client devices bound to the AP.

18. The AP of claim 17, wherein transmitting the notification to the one or more client devices bound to the AP comprises: transmitting the notification to a cloud server configured to transmit the notification to the one or more client devices bound to the AP.

19. The AP of claim 17, wherein the set of computer program instructions stored in the memory, which, when executed by at least one of the processors, further perform actions of:
- transmitting a first Automated Frequency Coordination (AFC) inquiry request including the location information of the AP to an AFC server;
- receiving a first AFC response from the AFC server, wherein the first AFC response indicates available frequency spectrum and power constraints thereon for the AP;
- transmitting a second AFC inquiry request including a redetermined location information of the AP to the AFC server, wherein the redetermined location information of the AP is redetermined after it is determined that the location information of the AP is invalid; and
- receiving a second AFC response from the AFC server.

20. A non-transitory computer readable storage medium having program instructions embodied therewith, the program instructions executable by a processor of an access point (AP) to cause the processor to:
- obtain a location information of a client device wirelessly coupled to the AP;
- determine a location information of the AP based on the location information of the client device; and
- in response to determining that the location information of the AP is invalid, transmit a notification indicating the invalidity of the location information of the AP to one or more client devices bound to the AP.

* * * * *